United States Patent [19]

Manasso et al.

[11] Patent Number: 5,207,822
[45] Date of Patent: May 4, 1993

[54] SYNERGISTIC FILLER BLENDS FOR WOOD-CONTAINING PAPERS

[75] Inventors: John A. Manasso, Macon, Ga.; Kenneth Mueller, North Wales, Pa.; Susan Di Donato, Springfield, N.J.

[73] Assignee: ECC International Inc., Atlanta, Ga.

[21] Appl. No.: 863,592

[22] Filed: Apr. 3, 1992

[51] Int. Cl.$^5$ .................................................. C04B 14/04
[52] U.S. Cl. .................................... 106/416; 106/486
[58] Field of Search .................. 106/487, 486, 416; 509/145, 146, 147, 148, 149; 162/162, 181.8

[56] References Cited

U.S. PATENT DOCUMENTS 4,118,246 10/1978 Horzepa et al. .................... 106/484
4,738,726 4/1988 Pratt et al. .
4,943,324 7/1990 Bundy et al. ........................ 106/486

FOREIGN PATENT DOCUMENTS

440419A1 8/1991 European Pat. Off. .

Primary Examiner—Mark L. Bell
Assistant Examiner—Paul Marcantoni
Attorney, Agent, or Firm—Klauber & Jackson

[57] ABSTRACT

A high opacity, high light scattering filler pigment for use in wood-containing paper manufacture, comprising by weight 25 to 50% of a fine particle size hydrous kaolin which has been defined as to have particle size distribution such that less than 20% by weight are of less than 0.3 μm E.S.D. and substantially the balance being a fine particle size calcined kaolin.

5 Claims, No Drawings

SYNERGISTIC FILLER BLENDS FOR WOOD-CONTAINING PAPERS

BACKGROUND OF THE INVENTION

It is well known in the paper industry that a wide variety of fillers and pigments such as titanium dioxide, calcium carbonate, silica, alumina and kaolin, are suitable for use as paper fillers. Kaolin, a hydrous aluminum silicate, is presently the most widely utilized of these and is available in a range of particle sizes and brightnesses, as well as being either delaminated or non-delaminated. Hydrous kaolin is white in color, has a fine particle size, and is relatively chemically inert. This, in addition to its low cost makes it an ideal paper filler. Although calcined (anhydrous) kaolin is also available for use as a paper filler and can impart greater opacity to paper than the hydrous kaolin, it has the serious disadvantage of generally being more abrasive.

Prior art kaolin paper fillers are typically produced by a beneficiation process which typically consists of fractionating in a continuous centrifuge to controlled particle size, followed by bleaching to remove iron-based colored compounds. In the bleaching process the kaolin is acidified with $H_2SO_4$ to a pH of about 3.0, and sodium hydrosulfite is then added to reduce the iron to a more soluble ferrous form which is removed during the dewatering process. The flocculated clay, generally at approximately 30% solids by weight, is then filtered, such as by dewatering on a rotary vacuum filter to a solids level of approximately 60% by weight. The filter cake is then either dried or redispersed with additional dry clay if it is to be sold as approximately 70% by weight solids slurry. To produce high brightness products, i.e. fillers having a brightness index greater than 90 (as measured by TAPPI procedure T-646-os-75), impurities may be removed from the kaolin clay by further processing the kaolin clay through flotation or magnetic separation. To produce a delaminated product, the coarse fraction from the initial centrifugation is ground in sand grinders to shear the stacks of platelets normally found in kaolin and thereby produce individual particles having an equivalent spherical diameter less than 2 microns.

The anhydrous kaolin products generally available as paper fillers are typically produced by calcining hydrous kaolin at temperatures up to 1050° C. so that structural hydroxyl groups are driven out as water vapor. The resulting material has an amorphous structure which contains voids which produce interfaces between kaolin and air. These interfaces of kaolin and air, which are not found in hydrated kaolin, serve as sites for light scattering. Because of these voids, calcined clay has greater optical efficiency than other kaolin fillers.

Other opacifying pigments are commercially available to the papermaker. Because of its high refractive index, 2.55 for anatase and 2.7 for rutile, titanium dioxide is presently the opacifier of primary commercial importance. When incorporated into paper, titanium dioxide also imparts exceptional brightness and whiteness to the sheet. However, the main disadvantage of titania is its cost. Commercial grade titania is approximately 4 times more costly than commercial grade anhydrous kaolin and up to 25 times higher than the commercial grade hydrous kaolin. Due to this cost factor, other products have been developed and are in commercial use as titania "extender" pigments. These products, which can be used to replace portions of the titanium dioxide without a loss of opacity of the paper, include calcined clay, delaminated hydrous clays, fine particle size silica and alumina, and sodium aluminum silicate. The effectiveness of either calcined or delaminated kaolin clay as extenders for titanium dioxide can, in part, be attributed to the paucity of colloidal fines, i.e. particles having a fineness of less than about 0.3 microns equivalent spherical diameter. Calcined kaolin can be produced having a content of only 5 to 10% by weight of colloidal particles and a brightness of 80-93 and standard filler clay can be produced having a content as high as about 40% by weight of colloidal particles.

STANDARD NEWSPRINT

Standard news has traditionally been made with no filler from a furnish of approximately 70+% mechanical pulp, 30% chemical pulp. Its brightness is generally 58 or less. Its opacity is very good due to the low brightness mechanical pulp and minimal calendering.

Since the introduction of *USA Today* in 1982, there has been a new impetus for improved newsprint quality. This publication is printed by offset on a higher brightness newsprint (58+), and features four-color graphics.

"IMPROVED" NEWSPRINT

So-called "improved" newsprint is an upgrade in brightness and/or printability. The improvements come from the use of better quality groundwood (lower freeness, higher brightness), more chemical pulp, the use of fillers, and/or additional on-machine calendering. Brightness ranges up to 62. It is generally slightly smoother than standard news. Since the more highly developed groundwood is lower in opacity than standard newsprint grade groundwood, the basis weights of these grades are usually increased slightly. These grades are most often printed by offset or rotogravure. They are primarily used in Sunday supplements and inserts. The newsprint used for *USA Today* would fall into this category, too.

DIRECTORY

The primary distinction of directory from newsprint is its lower basis weight (about 35 g/m$^2$). This results in lower strength and opacity, requiring the use of more chemical pulp and lower freeness groundwood and the use of fillers.

These grades are printed primarily by the offset process, and are used in telephone directories and catalogs. However, it generally has lower brightness and gloss compared to catalog paper.

A significant trend in the directory paper market is a drop in basis weight to 30-31 g/m$^2$. This market is currently very competitive. Following the AT&T break-up, the various telephone companies, as well as others, have intensified competition for yellow pages advertising. This has precipitated the lower basis weights (thinner books) and demand for improvements in print quality. Lowering basis weight has resulted in increasing use of kaolin fillers to maintain opacity.

HIGH BRIGHTNESS, MACHINE FINISHED

As the name implies, these grades are differentiated from newsprint in brightness and finish. The brightness ranges from 62-69% and smoothness from 40-100 ml/min (Sheffield). The brightness is typically obtained by clean, highly developed (low freeness), bleached mechanical pulp. The finish is normally obtained through high intensity and temperature gradient calendering.

As brightness is increased through pulp processing, the opacity decreases. This necessitates increasing basis weight or filler loading. The typical basis weight range is 50–70 g/m². These grades are used primarily for newspaper inserts, Sunday supplements, magazines, catalogs and groundwood business forms. They are printed by both offset and rotogravure.

There has been limited usage of fillers in newsprint with major justification being: economics, paper quality to include grade development and capacity expansion without capital equipment. Problems related to filler use are retention, paper internal strength which has an influence upon machine runability and paper surface strength which influences printability.

The choice of clay type is dependent upon the objectives for filler use. For pulp extension on satisfying the economic and capacity expansion objective noted above, a low-cost water-washed filler is the most effective. Typical of these kaolin grades is Georgia Kaolin's WP or Wrens Filler HB of 84–85 brightness. For quality improvement, the choice of kaolin will be dependent upon described properties. Kaolins available range from the 88 to 90 brightness delaminated filler clays like Georgia Kaolin's Astra-Fil and Astra-Fil 90, to newer high performance fillers such as Georgia Kaolin's hydrous clay, Astra-Plus (90 brightness), and 80–93 brightness calcined clays. The latter calcined products will yield major improvements in opacity and brightness at minimum loadings (2–4%). This low loading aspect is important to the papermaker because of strength. Paper machine runability is also impaired with increasing filler loadings. Calcined or anhydrous kaolins have the disadvantage of high cost and are extremely abrasive. Also, they have a greater negative influence upon paper strength than hydrous filler clays.

Hydrous filler kaolins range in quality from the low brightness, relatively coarse particle-sized water-washed product (WP) to 90 brightness Astra-Plus type clays. Being lower in cost than most newsprint furnishes, coarse hydrous clays are ideal for fiber extension. Incorporation of these clays into newsprint will yield improvements in opacity, brightness and smoothness but at significantly higher loadings. In fact >10% in sheet will be required to yield similar improvements to calcined clay at levels of 2–4% in sheet. Paper strength is degraded significantly at the high loadings and severe runability problems result.

Use of the high performance clays offer the newsprint producer the capability of improving quality to the same degree as calcined clay with only a 1.5× higher loading than that required with calcined clay. In spite of the higher filler requirement, the strength of paper with Astra-Plus type products will be equal or higher than that with calcined clay. However, even at the higher loadings, abrasiveness will be lower and there will be less propensity to pick in the offset printing process with the hydrous clay.

A continued trend toward 4-color offset printing demands a bright, white, smooth, strong substrate with good opacity. Generally, improvements in brightness, through mechanical pulp bleaching and increased proportions of chemical pulp, decrease opacity. Opacity can be maintained by increased basis weight or the use of fillers or dyes. Because of this trend, there is increasing pressure to develop more cost effective fillers. This invention pertains to such a development.

As noted earlier, other segments of the groundwood containing paper market can be classified as specialties. Filler requirements are, in general, similar to those addressed for newsprint. The one exception is filled supercalendered papers. In this application, high levels of low cost filler grades are utilized to obtain smoothness, opacity, gloss and low porosity. Paper strength is a minor issue and quality improvements, until recently have been obtained through modifications of furnishes and machine conditions. Recently, there has been an interest in alternate fillers for improvements of optical properties.

Included in other uncoated groundwood specialties are lightweight directory grades, the high brightness machine finished grades (including catalog, forms bond, newspaper inserts, Sunday supplements, magazines), and all other applications (such as paperback book, reply card, etc.). This section is much more complicated, due to the wide variety of grades. Also, unlike the filled supercalendered market, where fillers are major furnish components, most of these grades are made both with and without fillers. Combinations of furnish changes, basis weight changes, and finishing (including surface sizing and calendering), in addition to filler options, allow the papermaker wide degrees of freedom in producing these grades.

Generally, the use of fillers in these grades is based on economics and/or grade development. That is, clay would be used as an extender for more expensive fiber, or to provide quality enhancement in terms of opticals, surface smoothness, porosity, and print quality. Like in newsprint, each of the quality enhancements are attainable through use of the kaolin products described in this invention.

SUMMARY OF INVENTION

The present invention relates to a kaolin composition exhibiting high opacifying properties with a minimum negative influence upon paper strength properties. The kaolin composition can be formulated from a range of hydrous and calcined clay products. The uniqueness of the blends is such that wood-containing paper incorporating same has optical properties equivalent to those obtained with an entirety of calcined clays at similar loadings. Despite the fact that the product of the invention is formulated with a calcined clay having a scattering coefficient of 2400–2600 cm²/g and a hydrous filler clay having a scattering coefficient of 1900–2100 cm²/g, the resulting blend has unexpectedly been found to have a scattering coefficient of 2400–2600 cm²/g. The product of the invention can be formulated with a range of calcined clays of varying brightness 80–93 and particle size (67–88% $<2\mu$). In another unexpected aspect of this invention, it is found that wood-containing paper with the blends have higher strength than sheets with the calcined clay alone. This is indicated by measuring the breaking length of the paper, which is a measure of the length of paper which will disrupt or fail under its own weight when suspended vertically. This allows the papermaker to increase filler loadings without influencing machine runability.

The hydrous portion of the blend of the invention preferably comprises a fine particle size uncalcined kaolin which has been defined as to have a colloidal particle size content, i.e. of particles less than 0.3 microns in equivalent spherical diameter, of less than about 20% by weight, and more preferably of less than about 15% by weight. The hydrous component of the blend preferably comprises 25 to 50% by weight of the total with substantially the balance being a fine particle size calcined kaolin. A particularly advantageous hydrous product for use in the invention is that disclosed in U.S. Pat. No. 4,934,324, which product results from subjecting a starting kaolin to delamination, defining, surface treatment with an amine and aluminum sulfate, and bleaching. Kaolin products which have been defined as set forth in copending application Ser. No. 521,204, filed May 9, 1990 (incorporated herein by reference), are also utilizable as the hydrous Component of the present invention. Both products which have been treated with an amine and also upon which aluminum hydroxide has been precipitated, as well as clays which have not been so treated are effective for the blend.

The product of this invention is useful in the majority of uncoated wood-containing paper grades and coating basestock for lightweight coating application. The former can be categorized as standard newsprint, improved newsprint, directory, machine finished and filled supercalendered.

DESCRIPTION OF PREFERRED EMBODIMENTS

The product of this invention can be best described and understood by illustrative Examples. In the Examples to be presented, the majority of performance data were obtained in handsheet tests. The basic procedure consists of incorporating the pigments and fillers into a furnish utilized for uncoated wood-containing papers. As will be shown, such furnishes can vary in fiber pulp type and levels. After blending the various pulps or beating to a specified freeness, aliquots are taken to produce handsheets of the desired basis weight. To these aliquots, the required amounts of fillers or pigments are added to produce sheets having concentrations of 2% to 30% depending upon paper grade. Additives like alum and various retention aids are also added and these will be shown in Examples. After addition of all additives, handsheets were formed on 8"×8× Williams Sheet Mold, pressed and dried. These were tested for opacity, brightness, basis weight and total filler content by ashing using TAPPI standard test methods. Tensile properties of the filled handsheets were measured utilizing an Instron Universal Testing Machine.

From the data generated, opacity was corrected for basis weight variations utilizing Kubelka Munk Theory. Regression analysis was utilized to determine the relationship between filler content and opacity, brightness, and tensile properties. Using the regression equations, the properties of the paper with the various filler and pigment systems are compared at equal loading.

In the various Examples, comparisons are made of various calcined clays; most notably Georgia Kaolin's Astra-Paque LB of 80-82 brightness and having a particle size distribution (P.S.D.) such that 86 to 88% by weight of the particles have an equivalent spherical diameter (E.S.D.) of $<2\mu$. Blends were made with the hydrous Astra-Plus product of Georgia Kaolin Company, a high performance filler of >89.5 brightness and 88-92% $<2\mu$ equivalent spherical diameter. An untreated modification (i.e. not surface treated) of Astra-Plus was also used. Unless indicated to be "untreated", the Astra-Plus product, in accordance with U.S. Pat. No. 4,943,324, has been surface treated with a member selected from the group consisting of a water soluble amine, aluminum sulfate, and mixtures thereof. Whether or not surface treated, the kaolins identified as Astra-Plus have also been delaminated prior to defining, again as taught in the said U.S. Pat. No. 4,943,324. The Astra-Plus products were in all instances defined so as to include less than 20% by weight of particles having an E.S.D. of less than $0.3\mu$.

EXAMPLE I

In this Example, tests were made in a 22-lb. directory grade of the following furnish:
53% Thermo-Mechanical Pulp
31% Refiner Groundwood Pulp
16% Softwood Kraft Comparisons were made of a calcined clay of 80.5 brightness and a particle size of 67% $<2\mu$ equivalent spherical diameter, Astra-Plus and a 50/50 (by weight) blend of the two kaolins (Example I). A retention aid system of polyethylene oxide and phenolic resin was utilized. The clays were added as slurries to the pulp furnish. Results were as follows:

TABLE 1

| Filler | Opacity @ 8% | Brightness | Breaking Length (km) |
|---|---|---|---|
| Calcined Clay | 83.2 | 57.1 | 3.0 |
| Astra-Plus | 79.0 | 55.5 | 3.4 |
| Example I | 82.7 | 57.3 | 3.2 |

The optical properties, i.e. opacity and brightneness of Example I are above the values of 81.2 and 56.3 that would be expected from the blending of the calcined clay and Astra-Plus.

EXAMPLE II

Utilizing the same pulp furnish and retention aid system as Example I and a finer calcined clay (Astra-Paque LB) of particle size 77% $<2\mu$ equivalent spherical diameter and 81.5 brightness showed both synergistic optical and strength effects. A blend of 75 parts calcined clay and 25 parts Astra-Plus was tested in addition to the 50/50 mixture of Astra-Paque LB and Astra-Plus. Results are shown in Table 2.

TABLE 2

| | Opacity | | Breaking Length (km) | |
|---|---|---|---|---|
| Filler | 5% | 10% | 5% | 10% |
| Astra-Paque LB | 82.2 | 85.5 | 2.43 | 2.21 |
| Astra-Plus | 80.8 | 83.1 | 2.60 | 2.33 |
| 50 Astra-Paque LB/50 Astra-Plus (Example II) | 82.4 | 85.3 | 2.96 | 2.73 |
| 75 Astra-Paque LB/25 Astra-Plus (Example II A) | 81.9 | 84.8 | 3.00 | 2.73 |

EXAMPLE III

In this Example, a 30 lb. newsprint sheet was formulated with a pulp furnish of 85% thermo-mechanical pulp and 15% Softwood Kraft. Again, the retention aid system was polyethylene oxide and phenolic resin. The opacifying efficiency of the fillers were compared in paper with corrections made for brightness deficiencies. Results are shown in Table 3.

TABLE 3

| Filler | Opacity @ Sheet Brightness of 61 (@ 6%) | Breaking Length (km) |
|---|---|---|
| Calcined Clay (4148D) | 88.6 | 1.76 |
| Astra-Plus | 87.1 | 1.89 |
| Example III | 88.4 | 1.92 |

The calcined clay in this test had a brightness of 88.5. As can be seen, both opacity and tensile strength as measured by breaking length were equal or higher respectively than the values obtained with the individual fillers. With results like above, the papermaker can increase loadings with sacrificing strength with Example III. The results of this Example and the earlier ones show some dependency of response upon pulp differences.

EXAMPLE IV

This Example differs from Example III in the type of retention aid utilized. In this case, it was a high molecular weight anionic agent with aluminum sulfate also added to the system. There was strength improvements, beyond expectation, at various blend ratios of the calcined clay and Astra-Plus. Results are shown in Table 4.

TABLE 4

| Filler | Opacity | Brightness @ 6% | Bulk of Sheet | Breaking Length |
|---|---|---|---|---|
| Calcined Clay | 87.4 | 62.3 | 3.19 | 2.01 km. |
| Astra-Plus | 86.4 | 61.8 | 3.12 | 2.01 |
| Example IV A 50 Calc. Clay/50 Astra-Plus | 87.1 | 62.5 | 3.30 | 2.20 |
| Example IV B 75 Calc. Clay/25 Astra-Plus | 86.8 | 62.1 | 3.05 | 2.27 |

Optimum blend ratio in the above test for opacity was 50/50 with exception of strength obtained with the 75 calcined clay/25 Astra-Plus system. There are potentially significant cost savings with the blends.

EXAMPLE V

Several calcined clays were prepared in the laboratory of varying brightness and particle size as measured by cps. The latter is a measure of the volume percentage of centrifuged particle sedimentation or settling. For example, a 0.10 cps at 10 minutes means that 10% by volume of the centrifuged suspension was deposited as sediment during centrifugation. Comparisons were made of the blends and a commercial calcined clay of 80.5 brightness. All examples are 50/50 blends of calcined clay and Astra-Plus. The results appear in Table 5.

TABLE 5

| Filler | Clay Brightness | cps of Calcined Clay 1 min | cps of Calcined Clay 3 min | cps of Calcined Clay 10 min | Opacity @ 60 Br. @ 6% | Breaking Length km |
|---|---|---|---|---|---|---|
| Commercial Calcined Clay | 80.5 | — | — | — | 90.1 | 1.51 |
| Example V A | 88.5 | 0.11 | 0.16 | 0.22 | 89.7 | 1.42 |
| Example V B | 82.0 | 0.09 | 0.12 | 0.20 | 90.0 | 1.59 |
| Example V C | 81.0 | 0.02 | 0.05 | 0.10 | 91.0 | 1.63 |
| Astra-Plus | 90.2 | — | — | — | 89.1 | 1.46 |

The finer calcined products both yield equal or higher opacity and strength when blended with Astra-Plus than the commercial calcined clay. The furnish in these tests was similar to Example IV.

EXAMPLE VI

The product of this invention is also effective in a 30 lb. newsprint sheet prepared with a pulp blend of 85% TMP/15% Softwood Kraft with a high-molecular weight, cationic retention aid (polyacrylamide). Results appear in Table 6.

TABLE 6

| Filler | Opacity | Brightness @ 6% | Breaking Length km |
|---|---|---|---|
| Calcined Clay | 90.6 | 56.3 | 1.57 |
| Astra-Plus | 89.0 | 55.4 | 1.57 |
| Example VI | 90.2 | 55.9 | 1.71 |

EXAMPLE VII

The wide applicability of the new product for groundwood containing papers is further illustrated in a 22-lb. directory sheet having a pulp composition of 42% stone groundwood, 42% thermo-mechanical pulp and 16% unbleached sulfite pulp. In this case, print opacity—the ratio of the diffused reflectance of the sheet when backed by a black body to that of the sheet when backed by an opaque pad of the paper itself, was of concern. This property is of importance where the sheet is viewed when backed by printed pages. The retention aid system differed from that of the earlier examples as it contained bentonite and a cationic polyacrylamide. Astra-Paque LB an 81–82 brightness calcined clay was utilized in this test. Results were as follows (Table 7):

TABLE 7

| Filler | Print Opacity 2% | Print Opacity 6% | Brightness 2% | Brightness 6% | Breaking Length 2% km | Breaking Length 6% km |
|---|---|---|---|---|---|---|
| Astra-Paque LB | 81.9 | 84.6 | 55.2 | 60.4 | 3.52 | 2.95 |
| Astra-Plus | 81.5 | 83.4 | 55.2 | 59.6 | 3.84 | 3.51 |
| Example VII | 82.0 | 84.6 | 55.2 | 59.1 | 3.80 | 3.39 |

The opacifying efficiency of Example VII is equal to that of calcined clay at the filler contents of 2% –6%. Tensile strength of the paper containing Example VII is also equivalent to that of sheets with Astra-Plus alone and significantly higher than those with Astra-Paque LB. These properties will allow the producers of directory paper to realize cost benefits with the product of the invention.

EXAMPLE VIII

Comparative data of the pigment blend (Example VIII) of calcined clay and Astra-Plus against two commercially available low brightness calcined clay products (A and B) from different producers. Both have brightness values of 80–81 with particle size in the range of 78–83% <2$\mu$ equivalent spherical diameter. Example VIII was prepared by mixing slurries of 50% solids Astra-Paque LB and 65% solids Astra-Plus in a Waring Blender. The blended product was incorporated into a 30-lb. newsprint furnish of a Canadian producer containing an undisclosed blend of refiner groundwood, chemical thermo-mechanical pulp and bleached sulfite. The retention aid system was bentonite and a cationic agent. In this case, the mill is utilizing calcined clay at a loading level of 4% in the sheet to meet required properties. Results appear in Table 8.

TABLE 8

| Filler | Opacity | Breaking Length km @ 4% |
|---|---|---|
| Calcined Clay A | 84.4 | 2.73 |
| Calcined Clay B | 83.7 | 3.10 |
| Example VIII | 84.5 | 3.16 |

The opacity and strength of the newsprint sheets (Example VIII) are both higher than similar paper with the calcined clay. The cost of the Example VIII sample will be lower than that of either calcined product.

EXAMPLE IX

In this Example synergies were attained by using an ASTRA-PLUS type of product, which had not, however, been surface treated with an amine-. Thus, this product was a hydrous, delaminated and defined kaolin as taught in U.S. Pat. No. 4,943,324, but had not been surface treated with aluminum sulfate or hexamethybenediamine as otherwise set forth in said patent. In each case, the blends were made with 50% Astra-Paque LB. The newsprint furnish was a blend of 85% stone groundwood and 15% bleached sulfite. The retention aid system was polyethylene oxide and phenolic resin. It will be seen in Table 9 that excellent results are achieved, even without the surface treatment.

TABLE 9

| Filler | Opacity | Brightness @ 4% | Breaking Length km |
|---|---|---|---|
| Astra-Paque LB | 88.0 | 63.9 | 2.54 |
| Astra-Plus | 87.3 | 63.9 | 2.59 |
| Example IX A 50% Astra-Paque LB/50% Astra-Plus | 87.9 | 64.0 | 2.60 |
| Example IX B 50% Astra-Paque LB/50% Untreated Astra-Plus (88% <2μ) | 88.2 | 64.1 | 2.60 |

While the present invention has been particularly set forth in terms of specific embodiments thereof, it will be understood in view of the present disclosure that numerous variations upon the invention are now enabled to those skilled in the art, which variations yet reside within the present teaching. Accordingly, the invention is to be broadly construed, and limited only by the scope and spirit of the claims now appended hereto.

What is claimed is:

1. A high opacity, high light scattering filler pigment for use in wood-containing paper manufacture, comprising by weight
   (a) 25 to 50% of a fine particle size hydrous kaolin which has been defined as to have a particle size distribution such that less than 20% by weight are of less than 0.3 μm E.S.D., while not being chemically surface treated; and
   (b) substantially the balance being a fine particle size calcined kaolin.

2. A filler pigment in accordance with claim 1, wherein about 88 to 92% by weight of said hydrous kaolin are less than 2 μm E.S.D.

3. A filler pigment in accordance with claim 1, wherein said hydrous component has been delaminated.

4. A filler pigment in accordance with claim 1, wherein said hydrous and calcined components are present in approximately equal parts.

5. A filler pigment in accordance with claim 1, wherein said fine particle size hydrous and defined Kaolin has not been chemically surface treated with an amine.

* * * * *